(12) United States Patent
Kopp et al.

(10) Patent No.: US 11,600,881 B2
(45) Date of Patent: Mar. 7, 2023

(54) BATTERY MODULE

(71) Applicant: Robert Bosch GmbH, Stuttgart (DE)

(72) Inventors: Benjamin Kopp, Remseck am Neckar (DE); Christian Loew, Stuttgart (DE); Markus Schmitt, Tamm (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 17/066,984

(22) Filed: Oct. 9, 2020

(65) Prior Publication Data

US 2021/0111385 A1 Apr. 15, 2021

(30) Foreign Application Priority Data

Oct. 11, 2019 (DE) .......................... 102019215636.3

(51) Int. Cl.
| | |
|---|---|
| *H01M 50/20* | (2021.01) |
| *H01M 10/0525* | (2010.01) |
| *H01M 10/647* | (2014.01) |
| *H01M 10/6555* | (2014.01) |
| *H01M 10/658* | (2014.01) |
| *H01M 10/653* | (2014.01) |
| *H01M 10/615* | (2014.01) |

(52) U.S. Cl.
CPC ....... *H01M 50/20* (2021.01); *H01M 10/0525* (2013.01); *H01M 10/615* (2015.04); *H01M 10/647* (2015.04); *H01M 10/653* (2015.04); *H01M 10/658* (2015.04); *H01M 10/6555* (2015.04)

(58) Field of Classification Search
CPC ............. H01M 50/20; H01M 10/0525; H01M 10/615; H01M 10/647; H01M 10/653; H01M 10/6555; H01M 10/658
See application file for complete search history.

(56) References Cited

U.S. PATENT DOCUMENTS

| | | | |
|---|---|---|---|
| 2014/0038021 A1* | 2/2014 | Goesmann | ........ H01M 10/6554 429/120 |
| 2015/0079452 A1 | 3/2015 | Park et al. | |

(Continued)

FOREIGN PATENT DOCUMENTS

| | | | | |
|---|---|---|---|---|
| DE | 102009035461 A1 * | 2/2011 | ........ | H01M 10/0413 |
| DE | 102011013618 A1 | 9/2012 | | |

(Continued)

OTHER PUBLICATIONS

English Translation of DE102009035461A1 (Year: 2009).*

(Continued)

*Primary Examiner* — Stewart A Fraser

(74) *Attorney, Agent, or Firm* — Michael Best & Friedrich LLP

(57) ABSTRACT

A battery module having a plurality of battery cells (2), in particular lithium-ion battery cells (20) which in a longitudinal direction (3) of the battery module (1) are disposed so as to be mutually adjacent, and the plurality of battery cells (2) are mutually braced by means of a tensioning element (4), wherein a thermal compensation element (5) is disposed between a battery cell (2) and the tensioning element (4), and the tensioning element (4), on a side of the tensioning element (4) that faces away from the battery cell (2), is connected to a heating element (100).

20 Claims, 2 Drawing Sheets

(56) References Cited

U.S. PATENT DOCUMENTS

| | | | |
|---|---|---|---|
| 2017/0194680 A1* | 7/2017 | Muck | H01M 10/647 |
| 2018/0138563 A1* | 5/2018 | Behm | H01M 10/6556 |
| 2019/0245168 A1 | 8/2019 | Qin et al. | |
| 2020/0036064 A1* | 1/2020 | Hess | H01M 10/625 |
| 2020/0144576 A1* | 5/2020 | Yoshida | B60L 50/61 |
| 2021/0111447 A1* | 4/2021 | Schmitt | H01M 50/209 |

FOREIGN PATENT DOCUMENTS

| | | |
|---|---|---|
| DE | 102011015152 A1 | 9/2012 |
| DE | 102011076580 A1 | 11/2012 |
| DE | 102015208159 A1 | 11/2015 |
| DE | 102015010983 A1 | 2/2017 |
| DE | 102015014034 A1 | 5/2017 |
| DE | 102017105444 A1 | 9/2017 |
| DE | 102017009712 A1 | 4/2018 |
| DE | 102017219556 A1 | 5/2019 |
| EP | 3499609 A1 | 6/2019 |

OTHER PUBLICATIONS

U.S. Patent Office Final Action for U.S. Appl. No. 17/067,045 dated Dec. 5, 2022 (14 pages).

U.S. Patent Office Non-final Action for U.S. Appl. No. 17/067,045 dated Aug. 19, 2022 (12 pages).

* cited by examiner

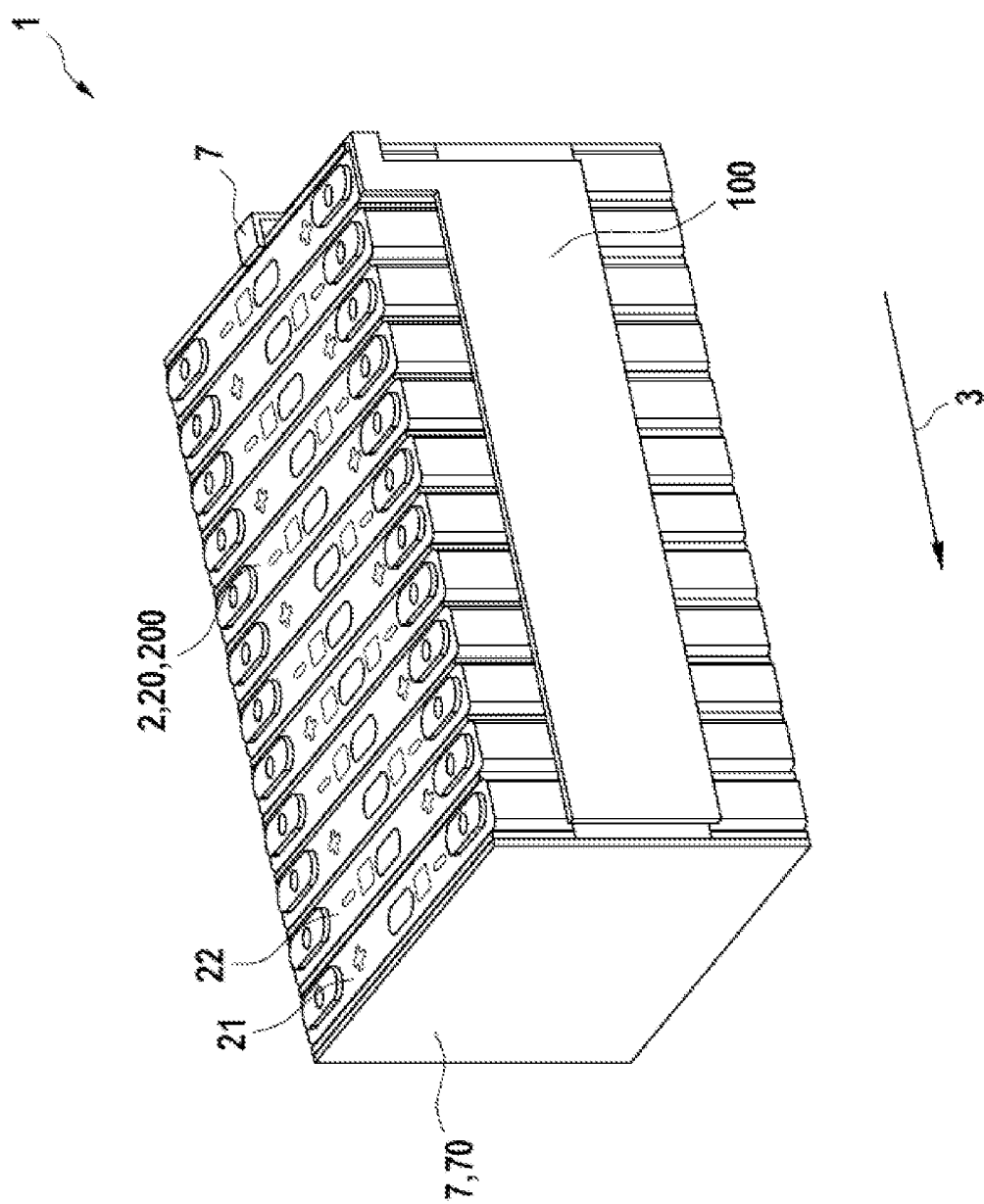

BATTERY MODULE

BACKGROUND

The invention proceeds from a battery module.

It is known from the prior art that a battery module has a plurality of individual battery cells which have in each case a positive voltage tap and a negative voltage tap, wherein the respective voltage taps are electrically interconnected so as to form an electrically conducting connection of the plurality of battery cells in series and/or in parallel, said battery cells thus being able to be interconnected so as to form the battery module. In turn, battery modules are interconnected so as to form batteries, or battery systems, respectively. Installation spaces in vehicles are often limited such that, apart from variable module sizes, an optimal utilization of an installation space available in said vehicles is also to be pursued.

The battery cells of a battery module, such as lithium-ion battery cells or lithium-polymer battery cells, for example, furthermore heat up during operation, this being caused by chemical processes by virtue of the electrical resistance of said battery cells when discharging or charging power. These processes are comparably pronounced in particular when discharging energy, or charging energy, respectively, in a comparably rapid manner. The more powerful a battery or a battery module, respectively, the more pronounced the heat created and, associated therewith, the requirements in terms of an efficient temperature-control system.

In order for the safety of a battery module to be enhanced and also in order to ensure the performance of the battery cells, the battery cells of a battery module are to be heated as well as to be cooled so as to be able to ideally operate said battery cells in a specific temperature range such that increased ageing behavior or a decomposition of the chemistry of the cells, respectively, can be prevented, for example. Temperature controlling, thus heating or discharging of heat, of the battery cells can be configured by a liquid temperature control using a water/glycol mixture, for example. This mixture herein is directed through a cooling plate which is disposed below the battery module, or through a continuous system. Such a cooling plate herein can be connected to a corresponding component of a cooling circuit.

Risks to battery modules can in particular lie in the fact that a battery cell of the plurality of battery cells exceeds a specific safety-critical temperature and exothermic chemical reactions which take place within a battery cell self-accelerate, this potentially leading to uncontrolled, self-accelerated heating of the battery cells. Such behavior is typically known as 'thermal runaway' in a battery cell and in the worst case can even lead to an explosion of the respective battery cell. Battery modules should therefore also provide a reliable discharge of such large quantities of heat and furthermore prevent that the heat of such a runaway battery cell is able to be transmitted to other adjacent battery cells. This is generally known as propagation protection. By virtue of a predefined installation space, it is not always possible to adhere to large spacings, for example in the form of air gaps or thermally insulating materials, necessary for reliable propagation protection, and thus to prevent the propagation to adjacent battery cells.

Thermal decoupling of the battery cells among one another can often not be configured to a sufficient extent in order for propagation to be reliably suppressed.

For example, publication DE 10 2015 010 983 A1 discloses a battery module having a basic temperature control device which is configured for a basic temperature control of all individual battery cells of the battery module, and furthermore having a compensation temperature control device which is configured for a compensation temperature control of the battery cells.

DE 10 2017 009 712 A1 shows an energy accumulator having an insulation element which is disposed between two battery cells, and a cooling element including a thermally conducting material and a displacement material.

DE 10 2015 208 159 A1 discloses a traction battery group comprising an insulation member which is disposed between an end plate and the battery cell.

EP 3 499 609 A1 shows a battery module having a plurality of battery cell receptacles.

Publication DE 10 2011 013 618 furthermore shows a battery module having a bracing installation.

SUMMARY

A battery module having a plurality of battery cells offers the advantage that the battery cells can be heated in a reliable and space-saving manner. In comparison to temperature control systems such as, for example flow heaters, through which a temperature control liquid passes, no leakages where coolant can exit can in particular arise, and installation space can be saved.

Comparatively simple assembling can furthermore be provided.

To this end, a battery module having a plurality of battery cells is provided according to the invention. The plurality of battery cells are in particular configured as lithium-ion battery cells. The plurality of battery cells herein can also be configured as lithium-sulfur battery cells or as lithium-polymer battery cells.

These battery cells in a longitudinal direction of the battery module herein are disposed so as to be mutually adjacent. The battery cells herein are in particular disposed beside one another.

The plurality of battery cells herein are mutually braced by means of a tensioning element. The tensioning element mutually braces the battery cells in particular in a mechanical manner by exerting a defined pressure.

A thermal compensation element is disposed according to the invention between a battery cell and the tensioning element.

The tensioning element, on a side of the tensioning element that faces away from the battery cell, herein is connected to a heating element.

The heating element can preferably be configured as an active heating mat, for example. Such an active heating mat preferably comprises a conductor material and a carrier material. The carrier material herein receives the conductor material and can preferably be configured from a material which is not electrically conductive. The carrier material can preferably completely enclose the conductor material.

The conductor material herein is preferably configured so as to be thermally conducting in a comparably positive manner and can in particular be configured from an electrically conducting material. Such a construction can be configured, for example, by means of a flexible foil which comprises conductor tracks and in English is also referred to as a flex foil.

Such a construction can furthermore also be a heated woven fabric.

The heating element is in particular configured as an electric heating element which, when energized, generates heat by virtue of an electrical resistance.

The heating element expediently covers the tensioning element in a planar manner. To this end, the heating element is configured so as to be planar and has a comparatively minor height in comparison to the width and the length.

The thermal compensation element herein is in particular disposed directly between the battery cell and the tensioning element. This means that the thermal compensation element directly mechanically contacts the battery cell as well as the tensioning element, or that the thermal compensation element is connected in a materially integral manner to the tensioning element and/or the battery cell.

The heating element does not have to compensate for any relative movements between individual battery cells on account of the heating element being applied to an external side of the tensioning element, said external side being disposed on the side of the tensioning element that faces away from the battery cell, and on account of the thermal contact between the tensioning element and the battery cell being by way of the thermal compensation element.

According to one preferred aspect of the invention, the plurality of battery cells are in each case configured as prismatic battery cells. Prismatic battery cells typically comprise six lateral faces of which the lateral faces which are disposed so as to be opposite are disposed so as to be mutually parallel and are preferably also configured so as to be of identical size. Furthermore, lateral faces which are disposed so as to be directly mutually adjacent are typically disposed at right angles to one another. Such prismatic battery cells offer the advantage that simple and reliable bracing of the plurality of battery cells is possible. A space-saving cuboid battery module can in particular also be provided on account thereof.

It is to be noted here that the prismatic battery cells in the longitudinal direction of the battery module are preferably disposed so as to have the respective largest lateral faces thereof adjacent to one another. This means that the respective lateral faces referred to as end faces, base faces and cover faces conjointly configure dissimilar external faces of the battery module. In particular, the cover faces of the individual battery cells conjointly configure an upper side of the battery module, the base faces of the individual battery cells conjointly configure a lower side of the battery module, and the respective lateral faces conjointly configure in each case two external sides of the battery module. It is furthermore to be noted that the upper side and the lower side of the battery module are in particular disposed so as to be substantially mutually parallel and are configured so as to be of identical size. It is furthermore noted that the two external sides of the battery module are in particular disposed so as to be mutually parallel and are configured so as to be of identical size and are in each case disposed so as to be perpendicular to the upper side, or the lower side, respectively.

Dissimilar widths of such battery cells herein are not to be compensated for by the heating element but can be advantageously compensated for by the thermal compensation element. The heating element herein potentially has to compensate for variable lengths of the tensioning element.

The battery cells are advantageously disposed so as to be thermally insulating and mutually spaced apart in such a manner that a thermal conduction between two battery cells which are disposed so as to be directly mutually adjacent is reduced. The thermal conduction herein is preferably entirely suppressed.

This offers the advantage that heat which is discharged by one of the battery cells can be distributed uniformly to all other battery cells of the battery module by means of the tensioning strap. This offers in particular reliable safety in terms of a propagation described at the outset in the event of a potential thermal runaway of a battery cell, since the entire heat which is disproportionally discharged by this battery cell is transmitted not only to directly adjacent battery cells but can also be distributed uniformly to the remaining battery cells. The increases in temperature of the individual battery cells created on account thereof are distributed uniformly in such a manner that none of said increases in temperature lead to a safety-critical temperature of the respective battery cell being exceeded in each case.

Furthermore, a homogenization of the temperatures among the individual battery cells during the operation can also be configured on account thereof.

It is expedient for the thermal insulation to be configured by a separating element. The separating element herein can in particular be configured from a phase-transformation material or a material having a thermal transmittance coefficient of more than $0.1 \text{ W}/(\text{m}^2\text{K})$.

The use of a phase-transformation material can reduce a required quantity of material which can lead to advantages in terms of costs.

These materials are furthermore preferably configured so as to be in each case electrically insulating. On account thereof, it is possible for a particularly reliable electrical insulation to be configured between the individual battery cells such that it is in particular possible for battery cell housings of the respective battery cells to be configured as voltage taps.

A transmission of heat between two battery cells which are disposed so as to be directly mutually adjacent is reduced by virtue of the comparably high thermal transmittance coefficient of said battery cells; in particular in the case of a thermal runaway of a battery cell, an excessive thermal transmission from a runaway battery cell to a battery cell which is disposed so as to be directly adjacent to said runaway cell can thus be reduced or prevented, respectively.

It is furthermore also expedient for the thermal insulation to be configured by an air gap.

It is to be noted for clarification at this point that the thermal insulation at all times thermally insulates two battery cells which are disposed so as to be directly mutually adjacent.

The tensioning element is preferably configured from a metallic material. The tensioning element can in particular be embodied from a steel material. The tensioning element can preferably likewise be configured from an aluminum alloy.

Such metallic materials which have a comparably high tensile strength, a comparably high elongation at break, and a comparably high elasticity modulus, can be used to be able to reliably absorb and transmit mechanical forces which are created by virtue of an expansion of the individual battery cells during charging and discharging, on the one hand.

On the other hand, such metallic materials, by virtue of the comparably high specific thermal capacity thereof, can absorb or store, respectively, heat which is discharged by a battery cell of the plurality of battery cells for a comparably long time and thus represent a type of intermediate storage for the discharged heat. An intermediate storage of heat which is transmitted from the heating element to the tensioning element is likewise possible. A buffer function can thus overall be imparted to the metallic material.

Furthermore, such metallic materials such as, for example, steel materials or aluminum alloys, by virtue of the comparably high thermal conductivity thereof can furthermore also transmit heat which is discharged by a battery cell in a comparably rapid manner to the respective other battery cells. A thermal runaway of a battery cell can thus be reliably countered on account thereof. This leads in particular to only a minor temperature increase in all other battery cells, said temperature increase also being configured so as to be distributed uniformly across all battery cells. The tensioning element can likewise uniformly distribute heat which is transmitted from the heating element such that only a minor difference between the temperatures of the individual battery cells arises.

A distribution function can thus be imparted to the metallic material.

The ratio between the buffer function and the distribution function can of course be influenced by the choice of a suitable metallic material. Materials having a higher specific thermal capacity could be chosen for configuring an ideally large buffer function, on the one hand. Materials having a higher thermal conductivity could be chosen for configuring a greater distribution function, on the other hand. This can be particularly advantageous for heating.

Overall, such an embodiment can serve for reliably countering a thermal runaway of the battery cell on account of the buffer function as well as the distribution function. A combination of the buffer function and the distribution function serves in particular for improving safety, for example in the case of a thermal runaway of the battery cell. Reliable temperature control, in particular reliable heating, as well as improved safety in relation to a thermal runaway of a battery cell can be configured on account of such a configuration of the battery module.

According to one aspect of the invention, the plurality of battery cells is disposed between two end plates. The end plates are preferably also configured from a metallic material just described such that the advantages just described of a metallic embodiment are likewise derived. End plates offer the advantage that a more uniform distribution of a mechanical force transmitted by the tensioning element can be configured for bracing the plurality of battery cells.

The tensioning element herein can be disposed so as to encircle the two end plates. Such an embodiment offers the advantage that no additional connections have to be configured between the end plates and the tensioning element. To this end, two ends of the tensioning strap can in particular be connected to one another in a materially integral manner.

The tensioning element can furthermore be in each case connected in a materially integral manner, such as preferably welded, to the two end plates. Such a configuration can offer the advantage that a materially integral connection configures a comparably high thermal conductivity between the tensioning element and the respective end plate. The end plates can furthermore also absorb heat from the tensioning element and optionally discharge said heat to an environment of the battery module. Conversely, this materially integral connection between the tensioning element and the at least one end plate can lead to the at least one end plate being heated by the heating element and thus being able to discharge heat to the outer battery cells. This leads to the outer cells having a smaller temperature differential in relation to the other battery cells, and to temperature differentials, which, in the longitudinal direction of the battery module, arise between the individual battery cells, being reduced. This has a positive effect on the cell temperature measurement and prevents non-uniform ageing of the cells.

It can be expedient herein for a thermal insulation or a further thermal compensation element to be disposed between a battery cell which is disposed so as to be proximal to the end and an end plate which is disposed so as to be directly adjacent to said end-proximal battery cell.

On account thereof, heat can be reliably transmitted from the end-proximal battery cell to the end plate.

However, it can also be expedient for a thermal insulation to be provided between a battery cell which is disposed so as to be proximal to the end and an end plate which is disposed so as to be directly adjacent to said end-proximal battery cell.

The thermal compensation element or else the further thermal compensation element is preferably configured as a thermally conductive adhesive or as a gap filler or as a gap pad.

Gap fillers are thermally conductive pastes or casting compounds which can reduce the thermal resistance between the tensioning element and the respective battery cell. Such thermally conducting pastes or casting compounds, respectively, typically have a comparatively high viscosity and are initially liquid, and cure upon application. Said thermally conductive pastes or casting compounds, respectively, can also comprise additives for increasing the thermal conductivity.

Gap pads are also referred to as thermally conductive pads but, as opposed to gap fillers, are not liquid but solid. Such thermally conductive pads typically have a high elasticity.

It is to be noted at this point that suitable thermally conductive adhesives, gap fillers or gap pads are known from the prior art.

In the preferred embodiment variant of the thermal compensation element as a thermally conductive adhesive, it would not be necessary for an additional contact pressure force to be exerted on the tensioning element during the operation in order for a reliable mechanical and thus also thermal link between the tensioning element and the respective battery cell to be configured, as the thermally conductive adhesive is in each case connected in a materially integral manner to said tensioning element and said respective battery cell.

Overall, thermal compensation elements can also serve for compensating dimensional tolerances of the individual battery cells in a transverse direction which is disposed so as to be perpendicular to the longitudinal direction of the battery module.

The thermal conductivity between the battery cell and the tensioning element, that is in particular a function of the layer thickness and a contact face of the thermal compensation element, can thus be easily and reliably adapted to a heat discharge to be required of a respective battery cell by way of the thermal compensation element. For example, battery cells which are disposed in a central position of the battery module are more difficult to control in terms of temperature than battery cells which are disposed so as to be proximal to the end.

Of course, the thermal compensation element and preferably the thermally conductive adhesive herein can be applied to the tensioning element or else to the battery cells.

It is also to be noted at this point that a minimal layer thickness of the thermal compensation element is to be adapted to the maximum permissible particle size of a residual contamination requirement so as to ensure the electrical insulation between the battery cell and the tensioning band in the case of a particle which nevertheless arises.

This furthermore offers the advantage that a local interruption of the thermal conduction between the heating element and the battery cell can be reliably avoided since the thermally conductive adhesive can be configured for reliably linking the battery cell to the tensioning element, for example, and the heating element is furthermore able to be reliably disposed on the tensioning element also by means of a thermally conductive adhesive, for example.

The heating element can furthermore be connected to the tensioning element by means of a further thermal compensation element such as, in particular, an adhesive connection, preferably by means of a thermally conducting adhesive. This thermally conductive adhesive herein can be applied to the tensioning element and/or to the heating element, for example.

The further thermal compensation element can of course also be a gap filler or a gap pad.

It can furthermore be expedient herein for the tensioning element to have an electrical insulation. The latter can preferably be configured as a coating which is configured so as to be electrically insulating, or as an insulation film. Coatings can be applied by way of a cathodic paint bath or by anodizing, for example. Suitable insulation films are well known from the prior art.

One more alternative concept of the invention in which the tensioning band is disposed so as to completely encircle the plurality of battery cells, in particular without the plurality of battery cells being disposed between two end plates, is to be proposed at this point. On account thereof, it is possible for the dimensions of the battery module to be further reduced.

It is particularly expedient for the tensioning element to be embodied as a tensioning strap.

A tensioning strap is primarily distinguished in that said tensioning strap in the longitudinal direction thereof has by far the largest extension.

The tensioning element can furthermore be disposed in a central position of the height direction of the battery module such that the spacing between an upper side of the battery module and the tensioning strap, as well as the spacing between a lower side of the battery module and the tensioning strap, are of substantially identical size. The height direction herein is disposed so as to be perpendicular to the longitudinal direction of the battery module and perpendicular to the upper side of the battery module. The tensioning element could furthermore also comprise a plurality of tensioning straps such as, for example, two or three tensioning straps, which could be disposed uniformly in such a manner that the spacings between the tensioning straps are in each case identical.

The tensioning strap, or the plurality of tensioning straps, respectively, herein can in particular cover preferably 30 to 70%, furthermore preferably 40 to 60%, and particularly 50% of the respective external side of the battery module.

The heating element can in particular completely cover a surface of the tensioning element that faces away from the battery cells, or cover at least 75% of said surface.

BRIEF DESCRIPTION OF THE DRAWINGS

Exemplary embodiments of the invention are illustrated in the drawings and explained in more detail in the description hereunder.

In the drawings:

FIG. 2 shows an embodiment of a battery module according to the invention in a perspective illustration.

DETAILED DESCRIPTION

Figure 1:
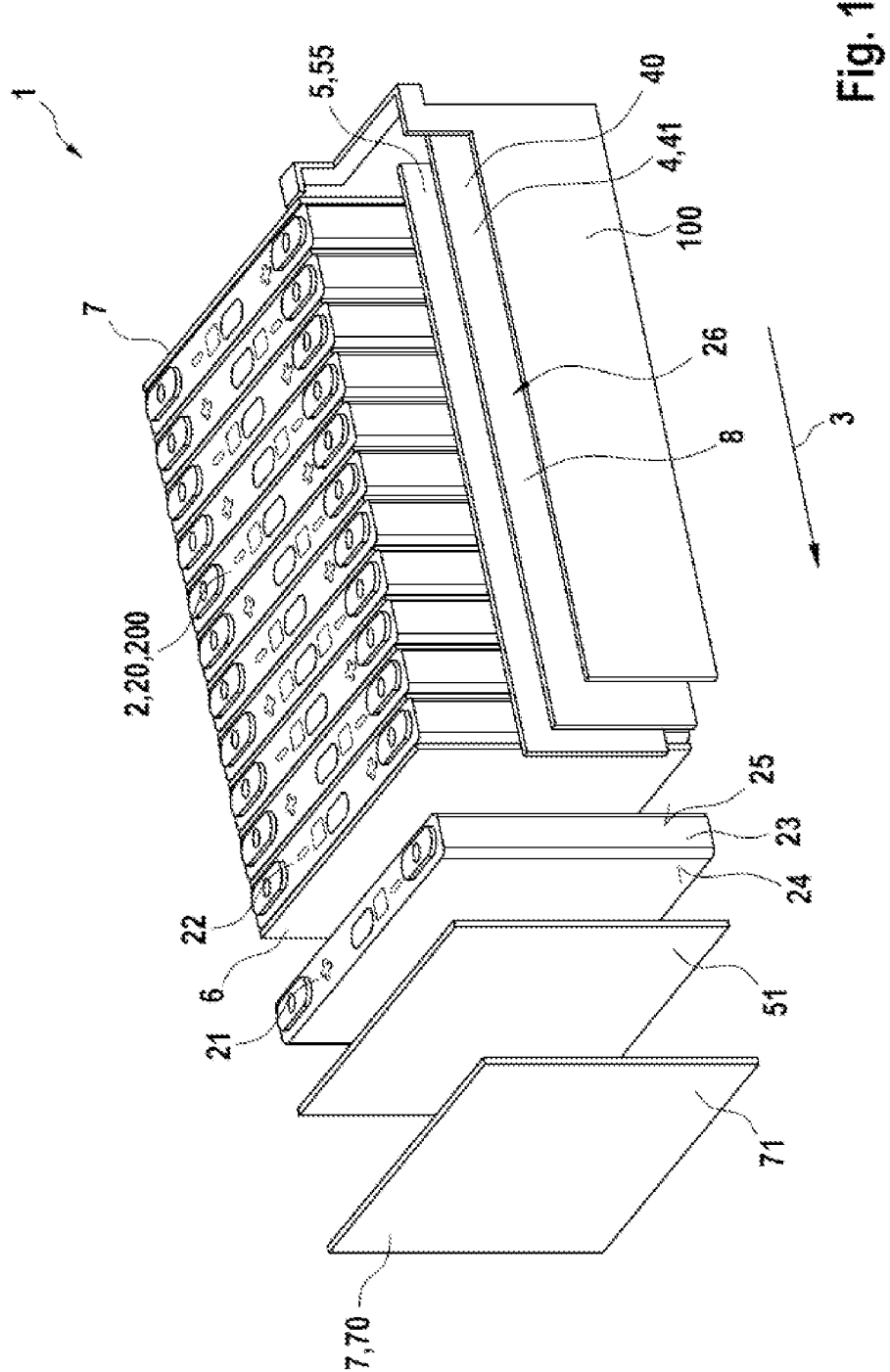
FIG. 1 shows an embodiment of a battery module according to the invention in a partially exploded illustration.

FIG. 1 shows an embodiment of a battery module 1 according to the invention in a partially exploded illustration, and FIG. 2 shows this battery module 1 in a perspective view. The embodiments according to FIG. 1 and FIG. 2 are to be conjointly described hereunder.

The battery module 1 has a plurality of battery cells 2 which are in particular configured as lithium-ion battery cells 20. According to the battery module 1 according to the invention which can be seen in FIGS. 1 and 2 the battery cells 2 are in each case configured as prismatic battery cells 200.

These battery cells 2 in a longitudinal direction 3 of the battery module 1 herein are disposed so as to be mutually adjacent. It is in particular to be noted at this point that the prismatic battery cells 200 are in each case disposed so as to be mutually adjacent by way of the respective largest lateral faces 24 thereof.

The battery cells 2 are furthermore disposed so as to be thermally insulating, for example mutually spaced apart. The spacing herein is configured in such a manner that thermal conduction between two battery cells 2 which are disposed so as to be directly mutually adjacent is reduced. In an exemplary manner it is to be noted that a first battery cell 21 and a second battery cell 22 are disposed so as to be mutually spaced apart. According to the exemplary embodiment shown, the thermal insulation can be configured by a separating element 6. For example, such a separating element 6 is disposed between two battery cells 2 which are disposed so as to be directly mutually adjacent, such as in an exemplary manner between the first battery cell 21 and the second battery cell 22. The separating element 6 herein can be configured from a phase-transformation material or a material having a transmittance coefficient of more than 0.1 W/(m$^2$K). It is to be noted at this point that the thermal insulation can also be configured by an air gap.

It can furthermore be seen from FIGS. 1 and 2 that a tensioning element 4 mutually braces the plurality of battery cells 2. The tensioning element 4 herein can be configured from a metallic material 40.

The tensioning element 4 is preferably embodied as a tensioning strap 41.

The tensioning element 4 can furthermore have an electrical insulation.

A thermal compensation element 5 herein is disposed between one of the battery cells 2 and the tensioning element 4.

The thermal compensation element 5 herein can be configured as a gap pad or as a gap filler, for example, or as can be seen, in particular, in FIG. 1 as a thermally conductive adhesive 55. It is to be noted at this point that the thermal compensation element 5, or the thermally conductive adhesive 55, respectively, is disposed on an external face of the battery module 2 that is configured conjointly by respective lateral faces 25 of the battery cells 2. On account thereof, the thermal compensation element 5, or the thermally conductive adhesive 55, respectively, is disposed so as to be in direct mechanical contact with the battery cells 2, or the lateral faces 25, respectively, and the tensioning element 4.

The plurality of battery cells 2 is preferably disposed between two end plates 7 which can preferably likewise be configured from a metallic material 70. A thermal insulation 51 can furthermore be disposed between a battery cell 23 which is disposed so as to be proximal to the end and an end plate 71 which is disposed so as to be directly adjacent to said end-proximal battery cell 23.

It can be derived in particular from FIG. 2 that the tensioning element 4 is in each case connected in a materially integral manner, such as preferably welded, to the two end plates 7. The tensioning element 4 could furthermore also be disposed so as to encircle the two end plates 7.

The tensioning element 4 furthermore has a heating element 100. The heating element 100 herein is disposed by way of a side 26 of the tensioning element 4 that faces away from the battery cell 2.

It is to be noted at this point that the heating element 100 can completely cover the tensioning element 4. The tensioning element 4 can in particular be disposed on the two largest external sides of the battery module 1 that are disposed opposite one another, and the heating element 100 can correspondingly be disposed on the respective tensioning element 4. The heating elements 100 herein can be configured as two heating elements 100, or as one contiguous seating element 100.

The heating element 100, in terms of control technology, can furthermore be connected to a battery cell 2 such as, for example, an end-proximal battery cell in order to detect the temperature of the latter and to adapt the heating behavior thereto.

What is claimed is:

1. A battery module having a plurality of battery cells (2), which in a longitudinal direction (3) of the battery module (1) are disposed so as to be mutually adjacent, and the plurality of battery cells (2) are mutually braced by means of a tensioning element (4), characterized in that a thermal compensation element (5) is disposed between a battery cell (2) and the tensioning element (4), and in that the tensioning element (4), on a side of the tensioning element (4) that faces away from the battery cell (2), is connected to a heating element (100).

2. The battery module according to claim 1, characterized in that the plurality of battery cells (2) are in each case configured as prismatic battery cells (200).

3. The battery module according to claim 1, characterized in that the battery cells (2) are disposed so as to be thermally insulating and mutually spaced apart in such a manner that a thermal conduction between two battery cells (21, 22) which are disposed so as to be directly mutually adjacent is reduced.

4. The battery module according to claim 3, characterized in that the thermal insulation is configured by a separating element (6) from a phase-transformation material or a material having a thermal transmittance coefficient of more than 0.1 W/(m²K), or is configured by an air gap.

5. The battery module according to claim 1, characterized in that the tensioning element (4) is configured from a metallic material (40).

6. The battery module according to claim 1, characterized in that the plurality of battery cells (2) are disposed between two end plates (7) and the tensioning element (4) is disposed so as to encircle the two end plates (7), or the tensioning element (4) is in each case connected in a materially integral manner to the two end plates (7).

7. The battery module according to claim 6, characterized in that a thermal insulation (51) or a further thermal compensation element is disposed between a battery cell (23) which is disposed so as to be proximal to an end of the battery module, and an end plate (71) which is disposed so as to be directly adjacent to said end-proximal battery cell (23).

8. The battery module according to claim 7, characterized in that the thermal compensation element (5) and/or the further thermal compensation element (51) are configured as a thermally conductive adhesive (55) or as a gap filler or as a gap pad.

9. The battery module according to claim 6, wherein the endplates (7) are configured from a metallic material (70).

10. The battery module according to claim 6, wherein the tensioning element (4) is welded to the two end plates (7).

11. The battery module according to claim 1, characterized in that the tensioning element (4) is disposed so as to completely encircle the plurality of battery cells (2).

12. The battery module according to claim 1, characterized in that the tensioning element (4) is configured as a tensioning strap (41).

13. The battery module according to claim 1, characterized in that the tensioning element (4) has an electrical insulation (8).

14. The battery module according to claim 13, wherein the electrical insulation (8) is configured as a coating which is configured to be electrically insulating, or as an insulation film.

15. The battery module according to claim 1, wherein the battery cells are lithium-ion battery cells (20).

16. The battery module according to claim 1, wherein the heating element (100) is an active heating mat and the active heating mat includes a conductor and a carrier material.

17. The battery module according to claim 16, wherein the conductor is a flexible foil.

18. The battery module according to claim 1, wherein the heating element (100) is an active heating mat constructed from a heated woven fabric.

19. The battery module according to claim 1, wherein the heating element (100) is configured to generate heat by electrical resistance.

20. The battery module according to claim 1, wherein the heating element (100) covers the tensioning element (4) in a planar manner.

* * * * *